US010395374B2

(12) United States Patent
Li et al.

(10) Patent No.: US 10,395,374 B2
(45) Date of Patent: Aug. 27, 2019

(54) SURVEILLANCE VIDEO BASED VIDEO FOREGROUND EXTRACTION METHOD

(71) Applicant: Peking University Shenzhen Graduate School, Shenzhen, Guangdong Province (CN)

(72) Inventors: Ge Li, Shenzhen (CN); Xianghao Zang, Shenzhen (CN); Wenmin Wang, Shenzhen (CN); Ronggang Wang, Shenzhen (CN)

(73) Assignee: PEKING UNIVERSITY SHENZHEN GRADUATE SCHOOL (CN)

( * ) Notice: Subject to any disclaimer, the term of this patent is extended or adjusted under 35 U.S.C. 154(b) by 0 days.

(21) Appl. No.: 16/089,517

(22) PCT Filed: Apr. 6, 2017

(86) PCT No.: PCT/CN2017/079520
§ 371 (c)(1),
(2) Date: Sep. 28, 2018

(87) PCT Pub. No.: WO2018/000882
PCT Pub. Date: Jan. 4, 2018

(65) Prior Publication Data

US 2019/0108642 A1 Apr. 11, 2019

(30) Foreign Application Priority Data

Jun. 27, 2016 (CN) .......................... 2016 1 0478505

(51) Int. Cl.
*G06T 7/194* (2017.01)
*G06T 7/136* (2017.01)
(Continued)

(52) U.S. Cl.
CPC .............. *G06T 7/194* (2017.01); *G06T 7/136* (2017.01); *G06T 7/20* (2013.01); *G06T 7/215* (2017.01);
(Continued)

(58) Field of Classification Search
CPC ............ G06T 2207/30232; G06T 7/20; G06K 9/00771; H04N 7/18
See application file for complete search history.

(56) References Cited

U.S. PATENT DOCUMENTS 4,896,446 A 1/1990 Gregory
5,392,553 A 2/1995 Carey
(Continued)

FOREIGN PATENT DOCUMENTS

CN 101216888 A 7/2008
CN 102103751 6/2011
(Continued)

OTHER PUBLICATIONS

International Search Report and Written Opinion for Corresponding Application No. PCT/CN2017/079520, dated Jun. 26, 2017. WO.
(Continued)

*Primary Examiner* — Bobbak Safaipour
(74) *Attorney, Agent, or Firm* — The Belles Group, P.C.

(57) ABSTRACT

Disclosed in the present invention is a video foreground extraction method for a surveillance video, which adjusts a size of a block to adapt to different video resolutions based on an image block processing method; and then extracts a foreground object in a moving state by establishing a background block model, the method comprising: representing each frame of image I in the surveillance video as a block; initializing; updating a block background weight, a block temporary background and a temporary background; updating a block background and a background; saving a
(Continued)

foreground, and updating a foreground block weight and a foreground block; and performing binarization processing on the foreground to obtain a final foreground result. The invention reduces the dimension of each frame of image in the surveillance video, eliminates the influence of the illumination on the block method by means of the pixel-based comparison, and meanwhile eliminates the influence on video analysis due to increasing size of the surveillance video. The invention can extract a dynamic foreground object, adapt to a larger size of a surveillance video, and has a lower algorithm complexity.

6 Claims, 4 Drawing Sheets

(51) Int. Cl.
*G06T 7/215* (2017.01)
*G06T 7/20* (2017.01)

(52) U.S. Cl.
CPC ............... *G06T 2207/10016* (2013.01); *G06T 2207/20016* (2013.01); *G06T 2207/20021* (2013.01); *G06T 2207/30232* (2013.01)

(56) References Cited

U.S. PATENT DOCUMENTS 5,410,833 A 5/1995 Paterson
5,970,642 A 10/1999 Martin
7,428,794 B2 9/2008 Oz
7,640,688 B2 1/2010 Oz
7,647,719 B2 1/2010 Fitzpatrick et al.
7,930,849 B2 4/2011 Abraham et al.
8,061,072 B1 11/2011 Crose
8,141,288 B2 3/2012 Dodd et al.
8,186,090 B1 5/2012 Chiarolanza et al.
8,381,427 B2 2/2013 Nill
8,402,683 B2 3/2013 Cabahug et al.
8,453,365 B1 6/2013 Ballard
D704,294 S 5/2014 Buttstock
8,720,099 B1 5/2014 Sisk
8,763,296 B1 7/2014 Chvala
8,844,185 B2 9/2014 Jarboe
8,950,099 B2 2/2015 Rogers et al.
8,955,245 B2 2/2015 Chvala
D736,336 S 8/2015 Mayberry et al.
9,360,272 B2 6/2016 Hopkins
9,404,708 B1 8/2016 Chow et al.
9,410,764 B2 8/2016 Jarboe
9,464,863 B2 10/2016 Mather et al.
9,546,845 B2 1/2017 Mather
9,664,476 B1 5/2017 Robinson et al.
9,664,479 B1 5/2017 Robinson et al.
2006/0254111 A1 11/2006 Giauque et al.
2007/0289190 A1 12/2007 Oz
2012/0036757 A1 2/2012 Larue
2014/0028794 A1 1/2014 Wu et al.
2014/0360074 A1 12/2014 Jarboe
2015/0338186 A1 11/2015 Hopkins
2015/0345881 A1 12/2015 Irvin
2016/0084612 A1 3/2016 Robinson et al.
2017/0059271 A1 3/2017 Bowen
2017/0358093 A1* 12/2017 Baltsen ................... G06T 7/136
2018/0181814 A1* 6/2018 Dong ................. G06K 9/00771
2018/0197294 A1* 7/2018 Pan ......................... G06T 7/194
2018/0293457 A1* 10/2018 Li ........................ G06K 9/4671

FOREIGN PATENT DOCUMENTS

CN 103077520 A 5/2013
CN 106204636 12/2016
WO 2014022170 6/2014

OTHER PUBLICATIONS

Magpul PRS GEN3 Precision Adjustable Stock (Options)—MSR Arms, LLC, https://www.msrarms.com, 2017, pp. 1-2.
Reaser, Rob, The AR-15 You Can't Afford NOT to Buy, Shooting Daily, 2017, pp. 1-4.
International Search Report and Written Opiniion, Patent Cooperation Treaty, dated Jan. 7, 2019, pp. 1-16.

* cited by examiner

Background

Fig. 4

Foreground

Fig. 5

SURVEILLANCE VIDEO BASED VIDEO FOREGROUND EXTRACTION METHOD

CROSS-REFERENCE TO RELATED PATENT APPLICATIONS

The present application is a U.S. national stage application under 35 U.S.C. § 371 of PCT Application No. PCT/CN2017/079520, filed Apr. 6, 2017, which claims priority to Chinese Patent Application No. 2016104785058, filed Jun. 27, 2016. The disclosures of the aforementioned priority applications are incorporated herein by reference in their entireties.

TECHNICAL FIELD

The invention relates to the field of digital image processing, in particular to a surveillance video based video foreground extraction method, which can be applied to preprocessing of a surveillance video so as to further analyze the surveillance video.

BACKGROUND ART

Foreground extraction of a video refers to separating a foreground object in the video from a background. As an increasingly common video type, surveillance video has the characteristics of long time, complex foreground and increasing resolution. In real life, surveillance videos are necessary for analysis of some cases and accidents since the surveillance videos can provide more evidence of the cases.

Existing foreground extraction technologies mainly use a Gaussian mixture model, an expectation maximization (EM) algorithm, saliency detection, a Trimap algorithm, a GrabCut algorithm and a superpixel method to extract foreground objects. However, the video foreground extraction methods have the following disadvantages:

(1) the above methods can partly extract a salient region in a video, but the extraction process does not take into account the difference between a static foreground and a dynamic foreground, which leads to a globally uniform background, while a foreground object in the stationary state should be seen as a new background;

(2) for surveillance videos with an increasingly large size, the processing speed of the above methods is slower and slower, and the processing efficiency for large-size videos is low; and (3) most of the above methods have high algorithm complexity and poor processing performance.

SUMMARY OF THE INVENTION

In order to overcome the shortcomings of the prior art described above, the present invention provides a video foreground extraction method for a surveillance video, which adjusts a size of a block to adapt to different video resolutions based on an image block processing method; and then extracts a foreground object in a moving state by establishing a background block model. The method can eliminate the influence on video analysis due to increasing size of the surveillance video.

For convenience of explanation, the following terms and parameters are agreed in the specification: (1) defining variables the dimension of which is the same as that of an original image: original image I; temporary background $\beta$; background BB; temporary foreground $\gamma$; foreground F; and (2) defining variables the dimension of which is the same as that of an image after dimension reduction: block image I'; temporary block background $\alpha$; block background A; background block weight $\Psi$; foreground block weight $\Phi$; foreground block end $\omega$.

Thresholds $\varepsilon_1$, $\varepsilon_2$ and $\varepsilon_3$ are set to determine the weight.

The principle of the invention is that a surveillance video contains multiple frames of images, while a background of the surveillance video is static, and the invention processes each frame of image in the surveillance video based on a block method and adjusts a size of a block to adapt to different video resolutions. A foreground object in a moving state is extracted by establishing a background block model. The dimension of each frame of image in the surveillance video is reduced, and the influence of the illumination on the block method is eliminated by means of the pixel-based comparison. Meanwhile, the influence on video analysis due to increasing size of the surveillance video is eliminated. Therefore, the method of the invention can extract a dynamic foreground object, adapt to a larger size of a surveillance video, and has a lower algorithm complexity.

The technical scheme provided by the invention is as follows:

Disclosed is a video foreground extraction method for a surveillance video, which adjusts a size of a block to adapt to different video resolutions based on an image block processing method; and then extracts a foreground object in a moving state by establishing a background block model. The method specifically comprises the following steps:

The first step is to gray each frame of image I and calculate an integral image, through which the sum of pixels in the block of different sizes can be conveniently calculated, and the sum of pixels in the block represents all pixels in the block, thus obtaining an image matrix block image I' with a smaller dimension instead of the original image. There are m*n pixel values in a block. The present invention uses the sum of the m*n pixel values in the block to represent the block, that is, the original m*n dimension has changed to the current 1*1 dimension.

The second step is initializing. For the first frame of image, the background B is initialized with the first frame of image in the video, wherein the background refers to the rest of each frame of image except the foreground object. The foreground F is initialized with a zero matrix, wherein the foreground refers to the foreground object in each frame of image. Intermediate results during processing are preserved with the temporary background $\beta$ and the temporary foreground $\gamma$. The block background A and the temporary block background $\alpha$ are initialized with the block image I'. The background block weight $\psi$ and the foreground block weight $\Phi$ are initialized with the zero matrix, wherein the weight refers to the duration that a certain block in the image lasts in a video stream, the initializing value of all the weights is 0, and the dimension is consistent with the dimension of the block background. The foreground block end $\omega$ is initialized with the zero matrix, wherein the end is used for judging the continuity of a block flow, and the dimension is consistent with that of the block image I'.

The third step is to compare each element in the current frame of block image $I'_i$ with a corresponding element in the previous frame of block image $I'_{i-1}$, and if the absolute value of the difference between the two exceeds the threshold $\varepsilon_1$, it is indicated that the difference between the corresponding blocks in the two frames is large and the current block may be the foreground. The background block weight $\psi$ is auto-increased by 1, and the temporary block background $\alpha$ is obtained by weighting and averaging the elements in the previous and current frames of block images. Otherwise, the background block weight ψ is reset to be 0, and the temporary block background α is reset to be the current element, wherein the temporary block background refers to that the current block may be part of the background, and whether it is the background depends on the fourth step.

In the fourth step, if the elements in the background block weight ψ exceed the threshold $\varepsilon_2$, it is indicated that the duration of the current block is long enough, and the block background A is updated with the elements in the temporary block background α.

In the fifth step, the first case is to compare an element in the block image $I'_i$ with a corresponding element in the previous frame of block image $I'_{i-1}$, and the difference between the two exceeds the threshold ε1; the second case is to compare an element in the block image I' with a corresponding element in the block background A, and the difference between the two exceeds the threshold $\varepsilon_1$; and the above two cases both indicate that the current block may be a potential foreground block. If one of the above conditions is met, the sixth step is executed; otherwise, the third step is executed.

The sixth step is to compare the pixels in the original image I corresponding to the elements in the current block image I' with the pixels corresponding to the background B, if the pixel difference exceeds the number of pixels of the threshold $\varepsilon_3$, that is, half of the number of pixels in the block, the seventh step is executed; otherwise, the third step is executed.

The seventh step is to save the difference between the pixel value in the original image I and the pixel value corresponding to the background B as the foreground F. For the second case of the fifth step, whether the foreground block is continuous or not is judged according to the foreground block end ω, and if yes, the background block weight ψ is not 0, which indicates that the current foreground is likely to be a new background, and the foreground block weight Φ is auto-increased by 1. The temporary foreground γ is obtained by weighting and averaging the pixels in the corresponding blocks in the current and previous frames. The temporary foreground herein refers to that the current block may be part of the background, and whether it is the background depends on the eighth step.

In the eighth step, if the foreground block weight Φ exceeds the threshold $\varepsilon_2$, the temporary foreground γ is set as the background B, the temporary block background is calculated, the background block weight is set to be $\varepsilon_2$, and the temporary foreground γ is set to be 0.

The ninth step is to binarize the foreground F obtained in the seventh step, and the current frame number is saved as the foreground block end ω.

The tenth step is to repeat steps 3-9 till all frames in the video are processed.

Compared with the prior art, the invention has the beneficial effects that:

Disclosed in the present invention is a video foreground extraction method for a surveillance video, which adjusts a size of a block to adapt to different video resolutions based on an image block processing method; and then extracts a foreground object in a moving state by establishing a background block model. The dimension of each frame of image in the surveillance video is reduced, and the influence of the illumination on the block method is eliminated by means of the pixel-based comparison. Meanwhile, the influence on video analysis due to increasing size of the surveillance video is eliminated. Therefore, the method of the invention can extract a dynamic foreground object, adapt to a larger size of a surveillance video, has a lower algorithm complexity, can be applied to the preprocessing of surveillance videos, provides support for further analysis of surveillance videos, and has important significance in current days when more and more surveillance cameras are used. Compared with the prior art, the invention has the following beneficial effects:

(1) based on the block processing method, the invention changes the comparison of a single pixel in the prior art to the comparison of the pixel sum, which relieves most of the calculation pressure in practical application, greatly reduces the calculation complexity, and has high execution efficiency;

(2) the invention realizes stable extraction of dynamic objects (i.e., foreground extraction) in the surveillance video by establishing the background block model and updating the background; and (3) by introducing the comparison of pixels in the block, the invention eliminates the influence of abrupt changes in illumination on the block method, and the method has high precision.

wherein the resolution of the image is 1920*1080 and the block size is 60*60, so the original image I can be represented by a block image' of 32*18.

Figures 2, 3:
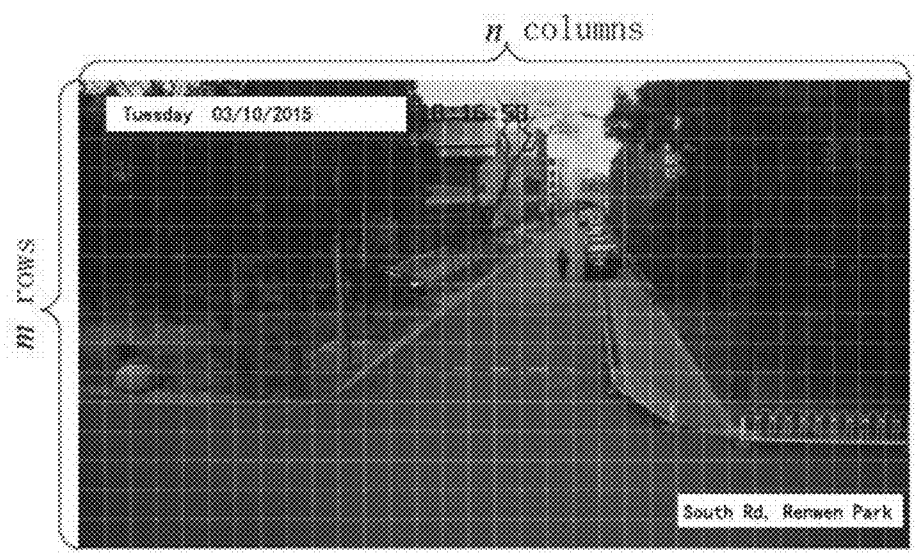
FIG. 2 is a schematic diagram showing that each frame of image I in the video is a block image F according to an embodiment of the present invention.

FIG. 3 is a frame of image in the surveillance video processed in an embodiment of the present invention.

Figures 4, 5:
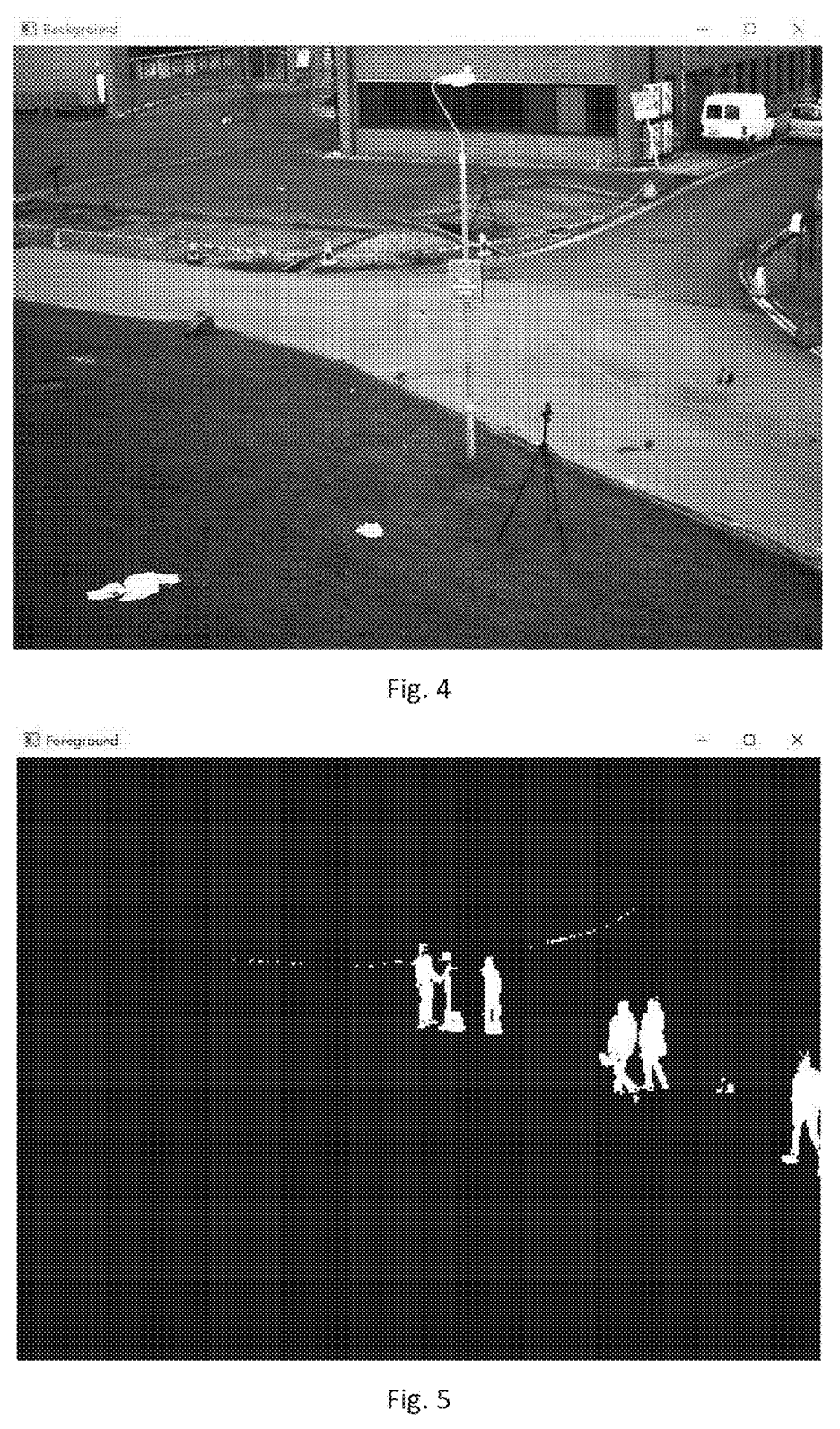

FIG. 4 is a background B obtained by processing the video by adopting the method of the present invention according to an embodiment of the present invention.

FIG. 5 is a foreground F binarized image obtained by processing the video by adopting the method of the present invention according to an embodiment of the present invention.

DETAILED DESCRIPTION OF THE INVENTION

The present invention will be further described by way of embodiments with reference to the accompanying drawings, but the scope of the invention will not be limited in any way.

The invention provides a video foreground extraction method for a surveillance video, which adjusts a size of a block to adapt to different video resolutions based on an image block processing method; and then extracts a foreground object in a moving state by establishing a background block model. The method can eliminate the influence on video analysis due to increasing size of the surveillance video.

Variables, defined in the following method or equations, the dimension of which is the same as that of an original image include: temporary background β; background B; temporary foreground γ; foreground F; Variables defined after dimension reduction of the original image include: temporary block background α; block background A; background block weight Ψ; foreground block weight Φ; foreground block end ω. Thresholds 1, 2 and 3 are used to determine the weight.

Figure 1A:
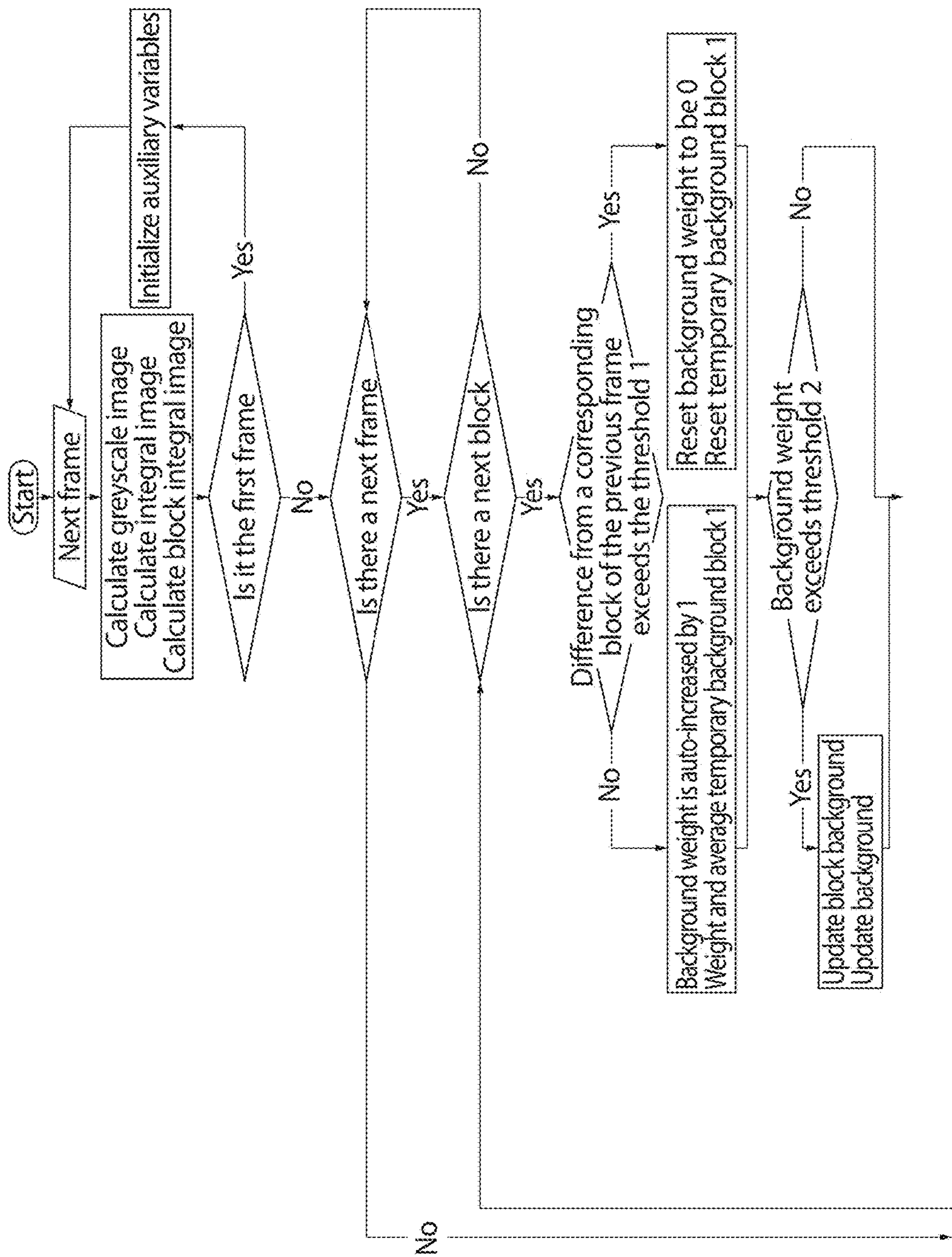
FIGS. 1*a* and 1*b* are flowcharts of a video foreground extraction method for a surveillance video provided by the present invention.
Figure 1B:
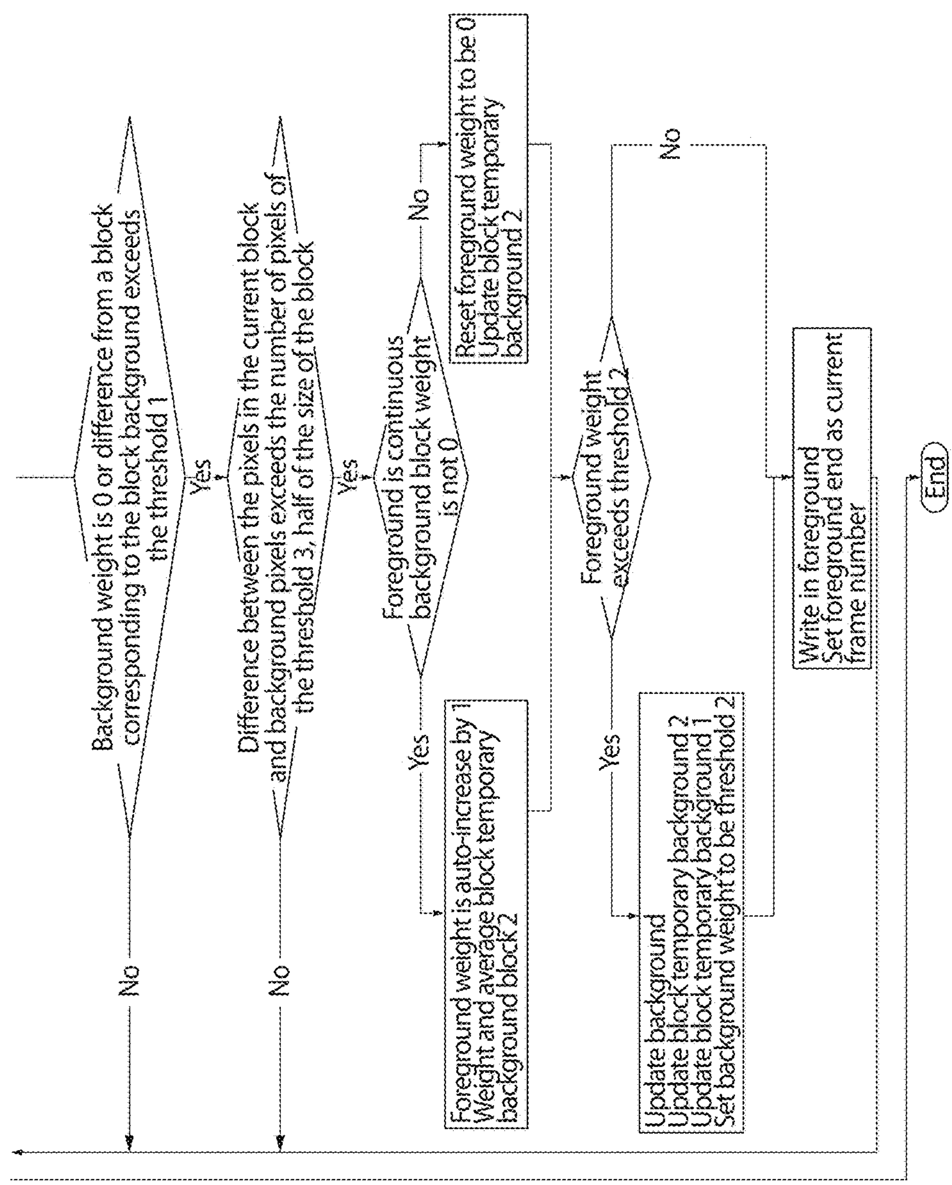

FIG. 3 is a frame of image in a surveillance video processed in an embodiment of the present invention, and the surveillance video contains multiple frames of images. FIGS. 1*a* and 1*b* are flowcharts of the video foreground extraction method for a surveillance video according to the invention, and the invention specifically comprises the following steps:

Step 1: as shown in FIG. 2, representing each frame of image in the video as a block. Assuming that the resolution of the video is P*Q (the resolution of each of the multiple frames of images in the surveillance video is P*Q), for each frame of image I in the video sequence, the grayscale image $I_{gray}$ of each frame of image is obtained, and the size of the block is determined to be p*q. In this embodiment, the resolution of the video is 320*240, so a smaller block which is 2*4 is used. Each block is represented with the sum (bs,t) of pixels in the block, as shown in equation 1:

$$b_{s,t}=\sum_{i=1}^{p}\sum_{j=1}^{q}p_{i,j}(s\in[0,m],t\in[0,n]) \quad \text{(equation 1)}$$

wherein s and t represent rows and columns of a corresponding new matrix respectively; and $p_{i,j}$ represents pixel values of the grayscale images.

Thus, the original image can be represented by a matrix I' as shown in equation 2:

$$I'=\begin{bmatrix} b_{0,0} & b_{0,1} & b_{0,2} & \cdots & b_{0,n-1} \\ b_{1,0} & b_{1,1} & b_{1,2} & \cdots & b_{1,n-1} \\ \vdots & \vdots & \vdots & \ddots & \vdots \\ b_{m-1,0} & b_{m-1,1} & b_{m-1,2} & \cdots & b_{m-1,n-1} \end{bmatrix} \quad \text{(equation 2)}$$

wherein $m=\frac{P}{p}, n=\frac{Q}{q}$.

Step 2: initializing the temporary background β and the background B with I, wherein the temporary foreground is represented with a zero matrix γ with the size of P*Q, the foreground is represented with F, the block background A and the temporary block background α are initialized with a matrix I', the background block weight is represented with a zero matrix ψ with the size of m*n, the foreground block weight is represented with Φ, and the foreground block end is represented with ω, as shown in equation 3 and equation 4:

$$\omega/\psi/\varphi=[0]^{m*n} \quad \text{(equation 3)}$$

$$\mathcal{F}/\gamma=[0]^{P*Q} \quad \text{(equation 4)}$$

Step 3: comparing the element $b_{s,t}^{I'_i}$ in the next frame of image $I'_i$ and the corresponding element $b_{s,t}^{I'_{i-1}}$ in the previous frame of image to obtain a difference $|b_{s,t}^{I'_i}-b_{s,t}^{I'_{i-1}}|$ and setting the threshold $\varepsilon_1$, if $|b_{s,t}^{I'_i}-b_{s,t}^{I'_{i-1}}|<\varepsilon_1$, the block background weight $\psi_{s,t}$ is auto-increased by 1, otherwise the block background weight ψs is reset to be 0, and the block temporary background and the temporary background are updated as shown in equation 5:

$$\begin{cases} \alpha_{s,t}=\dfrac{\alpha_{s,t}*\psi_{s,t}+b_{s,t}^{I'i}}{\psi_{s,t}+1}, & \\ & \psi_{s,t}++\left|b_{s,t}^{I'i}-b_{s,t}^{I'i-1}\right|-\varepsilon_1 \\ \beta_{s,t}=\dfrac{\beta_{s,t}*\psi_{s,t}+B_{s,t}^{I'i}}{\psi_{s,t}+1}, & \\ \psi_{s,t}=0,\ \alpha_{s,t}=b_{s,t}^{I'i},\ \beta_{s,t}=\beta_{s,t}^{I'i} & \text{others} \end{cases} \quad \text{(equation 5)}$$

wherein s and t represent all pixels in the image block corresponding to the current block;

in this embodiment, $\varepsilon_1$ represents the threshold of the difference between pixel sums (i.e., blocks herein), $$\varepsilon_1=\frac{p*q*\varepsilon_3}{2},$$

wherein the threshold $\varepsilon_3$ is used to compare the pixels to obtain a difference; when $\varepsilon_3$ is 15, $\varepsilon_1=60$, and the reason why the denominator of the equation is 2 is to offset the influence of the block method on the accuracy.

Step 4: representing the duration that a block stream remains unchanged with the threshold $\varepsilon_2$; If the value of a block background weight image exceeds the threshold $\varepsilon_2$, the block background is updated with the temporary block background, and the background is updated with a temporary background, as shown in equation 6:

$$\mathcal{A}_{s,t}=\alpha_{s,t},\ \mathcal{B}_{s,t}=\beta_{s,t}(\psi_{s,t}>\varepsilon_2) \quad \text{(equation 6)}$$

In this embodiment, $\varepsilon_2=15$, indicating that the size of the block stream is at least 15 frames, in this case, it is believed that the image conforms to the assumption that the background of the image in the surveillance video is static.

Step 5: when the difference between the current block and the background block exceeds the threshold ε1 or the background block weight is 0, executing step 6; otherwise, executing step 3.

Specifically, the first case is to compare an element in the block image I' with a corresponding element in the block background A, and if the difference between the two exceeds the threshold ε1, as shown in equation 7, step 6 is continued:

$$|b_{s,t}^{I'}-b_{s,t}^{\mathcal{A}}|>\varepsilon_1 \quad \text{(equation 7)}$$

in the second case, if the background block weight is $\psi_{s,t}$ is 0, as shown in equation 8, step 6 is continued:

$$\psi_{s,t}=0 \quad \text{(equation 8)}$$

otherwise, step 3 is executed.

Step 6: comparing the pixels in the current block with the pixels in a block corresponding to a background frame, if the pixel difference exceeds the number of pixels of the threshold ε3, that is, half of the number of pixels in the block, as shown in equation 9:

$$f(|I_{b_{s,t}}-\mathcal{B}_{b_{s,t}}|>\varepsilon_3)>\frac{m*n}{2} \quad \text{(equation 9)}$$

wherein f( ) represents the count of pixels within the block meeting the conditions; $I_{b_{s,t}}$ and $\mathcal{B}_{b_{s,t}}$ represent the pixels in the original image I corresponding to $b_{s,t}$ and the pixels corresponding to the background B respectively, and $b_{s,t}$ is the sum of m*n pixels in the block; step 7 is executed if the conditions are met (equation 9 is true); otherwise, step 3 is executed.

Step 7: saving the difference between the pixel value in the original image I and the pixel value corresponding to the background B as the foreground F. For the first case (the difference between the current block and the background block exceeds the threshold $\varepsilon_1$) of step 5, whether the foreground block is continuous or not is judged, if yes and the difference between the current and previous foreground blocks is less than the threshold $\varepsilon_1$, the foreground block weight is auto-increased by 1 and the foreground blocks are weighted and averaged, i.e. as shown in equation 10:

$$\begin{cases} \gamma_{s,t} = \dfrac{\gamma_{s,t} * \psi_{s,t} + I_{b_{s,t}}}{\psi_{s,t} + 1}, \psi_{s,t}{+}{+}\omega_{s,t} & \text{previous frame, } \psi_{s,t} = 0 \\ \psi_{s,t} = 0, \gamma_{s,t} = I_{b_{s,t}} & \text{others} \end{cases} \quad \text{(equation 10)}$$

Step 8: updating the background B with the temporary foreground if the value of the weight of the block foreground image exceeds the threshold $\varepsilon_2$, and updating the block background and the temporary block background by summing pixel values in each block of the updated background according to equation 11, wherein the block background and the temporary block background have the same value, and resetting the block background weight to be the threshold $\varepsilon_2$, namely equation 11:

$$\mathcal{B}_{s,t}=\gamma_{s,t}\mathcal{A}_{s,t}=\alpha_{s,t}=\Sigma p(p\in\gamma_{s,t}),\ \psi_{s,t}=\varphi_{s,t}\varphi_{s,t}>\varepsilon_2 \quad \text{(equation 11)}$$

wherein B is the background; s and t represent rows and columns of a corresponding new matrix respectively; $\gamma$ represents the temporary foreground; A represents the block background; $\alpha$ represents the temporary block background; $\psi$ represents the background block weight; $\Phi$ represents the foreground block weight.

This step enables the background to be updated in real time. For example, a car is a foreground when moving, but is updated to be a background when stopped. What is obtained in step 7 is a foreground. The step controls the real-time update of the background by setting a threshold. Judge according to the duration that the foreground stays static, if it does not move for a long time, the foreground is taken as a background.

Step 9: binarizing the foreground F obtained in step 7 to obtain the final foreground result, and saving the current frame number as the foreground block end $\omega_{s,t}$;

The order of step 8 and step 9 can be exchanged.

Step 10: repeating steps 3-9 till all frames in the video are processed so as to obtain the video foreground through extraction.

FIG. 4 is the background B obtained by processing the video by adopting the method of the present invention according to the embodiment. FIG. 5 is the foreground F binarized image obtained by processing the video by adopting the method of the present invention according to the embodiment.

It should be noted that the purpose of the disclosed embodiments is to help further understand the invention, but those skilled in the art will understand that various substitutions and modifications are possible without departing from the spirit and scope of the invention and the appended claims. Therefore, the invention should not be limited to what is disclosed in the embodiments, and the scope of protection of the invention is subject to the scope defined in the claims.

The invention claimed is:

1. A surveillance video based video foreground extraction method which adjusts a size of a block to adapt to different video resolutions extracts a foreground object in a moving state, the method comprising the following steps:

step 1: representing each frame of an image I in the surveillance video as the block and representing the image I as a matrix block I';

step 2: initializing for a first frame of the image I a temporary background $\beta$ and a background B with the image I, wherein a temporary foreground is represented with a zero matrix $\gamma$ with the size of P*Q, a foreground is represented with a matrix F and initialized with the zero matrix, a block background A and a temporary block background $\alpha$ are initialized with a matrix I', a background block weight is represented with a zero matrix $\psi$ with the size of m*n, a foreground block weight is represented with $\varphi$ and initialized with the zero matrix, and a foreground block end is represented with $\omega$ and initialized with the zero matrix;

step 3: setting an s and a t to represent respective rows and columns of a matrix block, comparing an element $b_{s,t}^{I'_i}$ in a matrix block $I'_i$ in a next frame of the image I with a corresponding element $b_{s,t}^{I'_{i-1}}$ in a previous frame of the image I to obtain a difference $|b_{s,t}^{I'_i}-b_{s,t}^{I'_{i-1}}|$, and setting a threshold $\varepsilon_1$, wherein if $|b_{s,t}^{I'_i}-b_{s,t}^{I'_{i-1}}|<\varepsilon_1$, a block background weight $\psi_{s,t}$ is auto-increased by 1; otherwise the block background weight $\psi_{s,t}$ is reset to be 0, and a block temporary background and the temporary background are updated;

step 4: representing a duration that a block stream remains unchanged with a set threshold $\varepsilon_2$, wherein if the value of a block background image weight exceeds the threshold $\varepsilon_2$, the block background is updated with the temporary block background, and the background is updated with the temporary background;

step 5: when the difference between a current block and a background block exceeds the threshold $\varepsilon_1$ or the background block weight is 0, executing step 6; otherwise, executing step 3;

step 6: comparing pixels in the current block with pixels in a block corresponding to a background frame, wherein if a pixel difference exceeds a number of pixels of a threshold $\varepsilon_3$, that is, half of the number of pixels in the block, executing step 7; otherwise, executing step 3;

step 7: saving the difference between a pixel value in the image I and the pixel value corresponding to the background B as a foreground F, wherein if the foreground block is continuous and the difference between current and previous foreground blocks is less than the threshold $\varepsilon_1$, the foreground block weight is auto-increased by 1 and the foreground blocks are weighted and averaged;

step 8: if the value of a block foreground image weight exceeds the threshold $\varepsilon_2$, updating the background B, the block background A, and the temporary block background $\alpha$ with the temporary foreground, resetting the block background weight to be the threshold $\varepsilon_2$, and setting the temporary foreground $\gamma$ as 0;

step 9: binarizing the foreground F obtained in step 7 to obtain a final foreground result, and saving a current frame number as a foreground end $\omega_{s,t}$; and step 10: repeating steps 3-9 until all frames of the image I in the video are processed so as to obtain a video foreground through extraction.

2. The surveillance video based video foreground extraction method according to claim 1, wherein the step 1 of representing the image I as the matrix block image I' further comprises:

firstly graying the image I and calculating an integral image, and then calculating a sum of pixels in the blocks of different sizes via the integral image, and obtaining an image matrix block image I' with a smaller dimension instead of the image I, wherein the sum of pixels in the block represents all pixels in the block.

3. The surveillance video based video foreground extraction method according to claim 1, wherein the size of the block is set to be p*q, $\varepsilon_1$ is a threshold representing the difference between blocks, the threshold $\varepsilon_3$ is the threshold of the difference between pixels, and $$\varepsilon_1 = \frac{p * q * \varepsilon_3}{2}$$

is set.

4. The surveillance video based video foreground extraction method according to claim 1, wherein the threshold $\varepsilon_2$ is 15.

5. The surveillance video based video foreground extraction method according to claim 1, wherein the threshold $\varepsilon_3$ is 30.

6. The surveillance video based video foreground extraction method according to claim 1, wherein the step 8 of updating the background B, the block background A and the temporary block background $\alpha$ with the temporary foreground is specifically calculated via the following equation:

$$\mathcal{B}_{s,t}=\gamma_{s,t}, \mathcal{A}_{s,t}=\alpha_{s,t}=\Sigma p(p\in\gamma_{s,t}), \psi_{s,t}=\varphi_{s,t}\varphi_{s,t}>\varepsilon_2$$

wherein B is the background; s and t represent rows and columns of a corresponding new matrix respectively; $\gamma$ represents the temporary foreground; A represents the block background; $\alpha$ represents the temporary block background; $\psi$ represents the background block weight; and $\varphi$ represents the foreground block weight.

* * * * *